Jan. 13, 1931.  J. M. McGINLEY  1,788,800
ADJUSTABLE SUPPORT
Filed Dec. 6, 1926
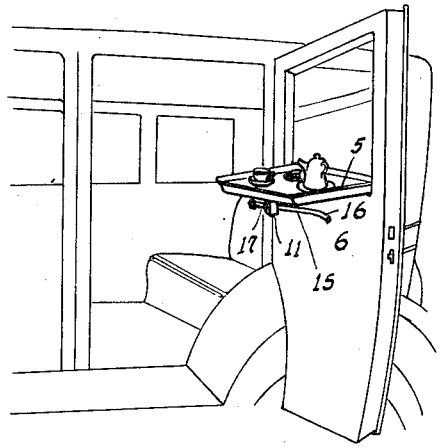
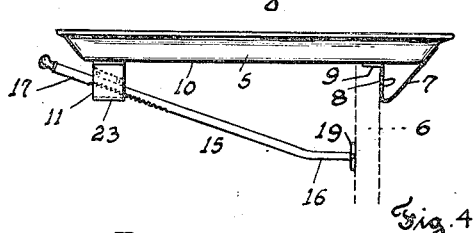
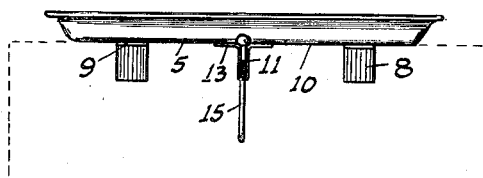
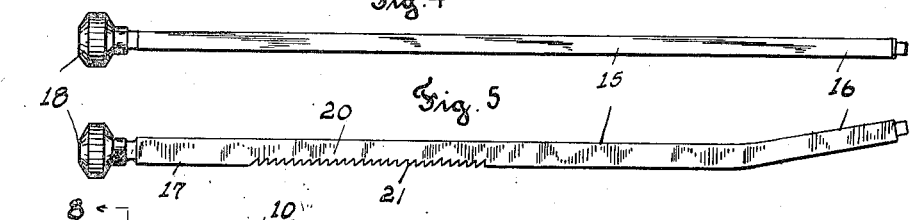
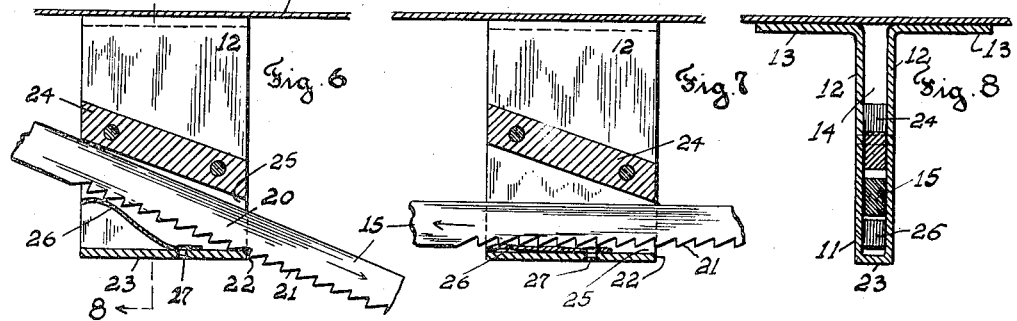
Inventor:
JAMES M. McGINLEY
BY: Frank D. Gray
ATTORNEY.

Patented Jan. 13, 1931

1,788,800

UNITED STATES PATENT OFFICE

JAMES M. McGINLEY, OF FORT WORTH, TEXAS, ASSIGNOR TO TRAY SERVICE COMPANY, OF DALLAS, TEXAS, A CORPORATION

ADJUSTABLE SUPPORT

Application filed December 6, 1926. Serial No. 152,772.

This invention relates to adjustable supports, and especially to adjustable supporting trays or other shallow receptacles which are detachable from the part upon which it is desired to mount them. I have disclosed in this invention a device which is particularly positive in its action, and simple in its construction, though durable and permanent.

It is an object of my adjustable support that it may be readily fixed upon the upper edge of a plate or wall which is inclined to a horizontal plane, that it may be easily adjusted in its angle to said wall or plate, and may be quickly detached therefrom without actuating any especial latch or connecting clamp or lock device.

It is a further object of my improvement that, while constructed to make its adjustment convenient on an edge as above stated, its means for detachably connecting it to such fixture serve well as an efficient support one upon the other to readily stack a large number thereof in a vertical series all of which are in horizontal arrangement and but little space intervening between the units of the series in the stack. Any one of these adjustable supports may be readily attached to upon the narrow edge of a vertical wall, such as an automobile door, the device being adjustable to the varying thickness of any vertical wall, or to the slight inclination of such wall to the vertical. In any adjustment of such device upon the supporting wall, the attachment will be positive and strong.

With these and other objects of my invention contemplated in this disclosure, I have herein set forth the same in the appended claims, described it in detail in the specification hereunto attached, and illustrated it in the accompanying drawings, in which—

Figure 1 is a perspective view of my adjustable support shown attached to an automobile door in the opening thereof;

Figure 2 is a side elevation of the device as applied to the upper edge of a vertical plate;

Figure 3 is a rear elevation of the same;

Figure 4 is a detail view of the brace bar;

Figure 5 is a similar view of said bar, but with the bar turned 90° on its axis;

Figure 6 is a detail view of the attaching means for connecting the bar with the bottom of the receptacle on which it is used, the guide yoke shown in longitudinal section, and a section of the bar shown in attached relation;

Figure 7 is a similar view showing the bar in unlatched relation, and

Figure 8 shows the same parts as in Figs. 6 and 7, but in cross section thereof.

Referring to the drawings, numeral 5 designates a receptacle, such as a tray for serving refreshments to guests, and especially intended to be temporarily supported upon the upper edge of an approximately vertical wall or plate 6 which may be the door of an automobile, or any vertical support such as a chair back upon which the device may be detachably applied.

I have shown the adjustable support as provided with a plurality of fixed attachment legs, preferably three, though a larger number may be used. Two of them 7 are preferably formed of metal strips bent into a V-shape having the ends of the V secured to the base of the receptacle as by soldering or welding. One of the arms 8 of each leg 7 is provided with an outwardly-bent flange 9 to lie flat upon the bottom 10 of the tray or other receptacle to which it is to be applied, and the other arm will be positioned against the side inclined wall of the tray, as shown clearly in Fig. 2.

These legs 7 will be spaced apart but attached to the receptacle on a common side or edge of the same and serve as stationary hook members to engage the upper edge of the supporting wall plate to receive it. The third leg 11 is hollow and is formed of a metal strip whose ends are bent toward each other in parallelism but spaced apart, the ends of the two parallel plates 12 thus produced being bent over at right angles to form flanges 13 which may be suitably secured to the bottom as are the flanges 9 of the legs 7. The three legs 7 and 11 being suitably positioned on the tray bottom, the leg 11 on an edge of the tray opposite from that carrying the legs 7, are preferably of equal effective length so that the receptacle may readily be supported upon a flat surface such as a table or another tray of the same general form, in horizontal position. Further, it will be seen that the three legs of any one of such trays will readily rest within the outer border flange of the usual tray, so that these trays so constructed, will stack one upon another in a pile of uniform trays of large number.

The leg 11 is also formed to provide a narrow but extensive channel 14 between the plates 12 which serve the purpose of a guide yoke in which an elongated brace member 15 may be adjustably secured. The channel 14 is open in a direction toward the support wall 6, so that the brace 15 may be inserted in the channel and extended therethrough, and one end thereof 16 contacting the side of the wall 6 opposite from that upon which the legs 7 bear, as shown in Figs. 1 and 2. The other end 17 of the brace 15 extends forwardly toward the user and has usually a handle tip or knob 18 for manual operation by which the angle of the brace relative to the tray and guide may be readily adjusted as well as the distance from the guide 11 to the wall 6.

The end 16 of the brace 15 is ordinarily bent upward from the main portion to result in a portion substantially parallel to the bottom 10. This end also may be provided with a yieldable tip 19 or washer member to avoid unnecessary scarring of the wall engaged. The main portion of the brace is usually formed rectangular in cross section, as shown clearly in Fig. 8, and has its operative lower surface cut for a portion 20 of its length to form ratchet teeth 21 inclined toward the leg 11, so that when the end 16 is forced downward somewhat, these teeth will operatively engage the edge 22 of the wall 23 spacing the plates 12 of the leg 11, while raising the end 16 will tend to disengage the teeth 21 from the edge 22.

Above the bottom wall 23 of the guide yoke 11, is secured within the channel 14 bar element 24 which is riveted or otherwise attached to the plates 12 at an angle to the bottom 10 of the tray with the rear end of the bar nearer the wall 23 than is the forward end or end of the brace carrying the knob. The rear end of the channel between the bar 24 and wall 23 has therefore a smaller opening than the forward end of the same. The normal tendency of the bar by its contact with the brace is then, to depress the end 16 away from the tray, and this smaller opening serves, therefore, as a pivot about which the brace 15 loosely moves from the position shown in Fig. 6 to the horizontal position it assumes in Fig. 7, and other intermediate positions, guided in the channel 14 by the parallel walls 12, as evident in the view shown in Fig. 8.

The normal position of the brace 15 is that shown in Fig. 6 resulting from the normal tendency of the flat spring member 26 which is fixed at one of its ends by the rivet 27 to the wall 23 intermediate its ends, the other end of the spring bearing upward against the under or toothed surface of the brace and thereby causing the brace at the front portion of the yoke 11 to rise upward in contact with the higher end of the bar 24, with the teeth 21 of the brace engaging the edge 22 which is adjacent to fix the brace against relative movement in the opening 25 in a lengthwise direction away from the wall 6 upon which the tray is to rest. When it is desired to shift the brace 15 in the channel 14 of the yoke 11 for any reason, a slight pressure exerted downward upon the knob 18 will overcome the spring 26 and slightly raise the engaging tooth from engagement with the edge 22, so that the brace may be readily moved lengthwise in the yoke, after which upon being released the spring causes another tooth to engage the edge 22 as before.

*Operation.*—It is evident that the structure disclosed will be strong and durable, and particularly simple and effective in operation, having few parts and requiring little experience to manipulate the adjustment of the only movable part—the brace member 15. This latter is normally in the position shown in Fig. 6 and ordinarily will have a washer 19 on the extreme end for engaging the wall 6 which is to receive the device. The exact location of the brace in the yoke 11 depends upon the thickness of wall 6. The tray 5 carrying the articles desired or empty is placed upon the wall in a horizontal position, and the brace adjusted to fit the wall 6 so as to position the tray or other receptacle in the plane desired. Ordinarily, the tray may be placed in the position desired with one hand while the other hand may, by grasping the knob 18, adjust the brace to retain the tray in position when further manual control is withdrawn. The brace 15 will be adjusted to provide the space between parts 6 and 19 just equal to the thickness of the wall 6.

When not used for supporting articles upon a vertical wall operatively, a large number of them may be stacked one upon another to a great height and in small space, for in such relation, the braces 15 of the several trays of a stack may be permitted to take the relative position indicated in Fig. 7, so that the three leg members 7 and 11 of each tray rests upon the bottom of the tray next below it. All the trays of such a stack will therefore have the same plane as the lowermost one of the series. Upon removing any one of the stack, however, the spring 26 of the tray will again position the leg 15 in the proper relative angle to the tray bottom required for use as a detachable support.

The invention is generally useful wherever small articles are to be supported upon a vertical wall, and especially where delicate receptacles for holding refreshments are to be so supported, the detachable supports being quickly and conveniently stacked in small space when not in use. The specific embodiment of the invention is subject to variation to meet particular conditions. The form shown is preferred as generally applicable to a wide range of uses.

What is claimed is:—

1. The combination of a flat receptacle having at least three parallel spaced feet secured to its under surface fixedly and permanently, two of said feet for engaging the upper edge of a vertical support, and another being hollow but having an imperforate bottom wall, a brace member extending transversely through said hollow foot at an angle inclined to the surface of the receptacle, and means within said hollow foot and secured thereto beneath the said member, for yieldingly pressing the latter toward its extreme inclination but permitting movement of the member through said foot.

2. The combination of a flat receptacle having secured fixedly and permanently to its under surface at least three parallel spaced standards of equal length, two of them for engaging the upper edge of a vertical support, and another being hollow, and a brace member pivoted between its ends in the hollow standard for movement in a vertical plane, and a spring member in said hollow standard normally pressing the farther end of the brace member away from the receptacle and against the support, the said standards being grouped on said receptacle bottom in a smaller area than the outer outline of the same, so that a series of such receptacles may be readily stacked one upon another with the standards of each resting within the receptacle next below it, the brace member yielding toward the receptacle on its pivot to permit such unimpeded stacking of the series.

3. The combination of a flat receptacle having secured to its under surface three or more spaced feet of equal length, two of them for holding the receptacle upon the edge of a vertical support, and another being hollow with a bottom wall, a brace member extending through the hollow foot in a direction towards the lateral face of the support, the member having a series of teeth on one face adapted to engage the rear edge of the said bottom wall adjustably, and means within said hollow foot yieldingly engaging the brace member at the rear of said rear edge tending to normally lower the farther end of the member at its contact point with said support, but permit movement of the contact end toward the receptacle so that the said feet may directly engage the receptacle next below it when stacking a plurality of such receptacles one above another.

4. In supporting means for adjustably supporting a flat receptacle upon the upper edge of a vertical wall, a hollow standard secured to the bottom of the receptacle at a point farthest from the wall, in combination with an elongated brace member of a size permitting its extension transversely through the said standard and having a handle member at one end and a contact portion at the opposite end for engaging the wall, and means within the standard and contacting the brace member to normally and yieldingly hold the latter in longitudinal adjustment in the standard and press the contact end of the brace member away from the receptacle.

5. The combination of a flat receptacle having means adjacent one edge thereof for engaging the upper edge of a vertical support, a hollow standard secured to the under side of said receptacle and spaced from said engaging means, an elongated brace member extended through said standard from side to side at an angle inclined to the surface of the receptacle and having a handle at one end and a contact portion at the other end, said brace member being adjustably fastened in said standard to contact said support at varying distances from the hollow standard to thereby vary the inclination of said receptacle, and means within the said standard yieldingly pressing the brace member into fixed position of adjustment in said standard.

6. The combination of a flat receptacle having means adjacent one edge of a vertical support for engaging said edge, a hollow standard secured to the under side of said receptacle and spaced from said engaging means, an elongated integral brace member having a handle at one end and a contact portion at the opposite end, said brace member extending transversely through said standard but loosely therein and contacting the lateral surface of said support and said member being pivoted between its ends in said hollow standard to permit varied inclination to said support, the loose extension of the brace member in the standard permitting longitudinal adjustment of the former in the latter, and spring means in said standard pressing yieldingly against the said member tending to increase the inclination thereof to the receptacle but to permit reducing the inclination until the contact end of the member is in contact with the bottom of the receptacle.

7. The combination of a flat receptacle having means adjacent one edge for engaging the upper edge of a vertical support, a hollow standard secured to the under side of said receptacle and spaced from said engaging means, and a brace member extended transversely through said standard at an angle inclined to the surface of the receptacle and being adjustably fastened in said standard to contact said support at varying distances from said standard to thereby vary such inclination.

In witness whereof I have hereunto set my hand this 15th day of November, 1926.

JAMES M. McGINLEY.